T. G. & W. HODGKINSON.
APPARATUS FOR INDICATING THE DIRECTION WHENCE SOUND TRAVELS.
APPLICATION FILED JULY 31, 1911.
1,075,103.
Patented Oct. 7, 1913.
4 SHEETS—SHEET 1.
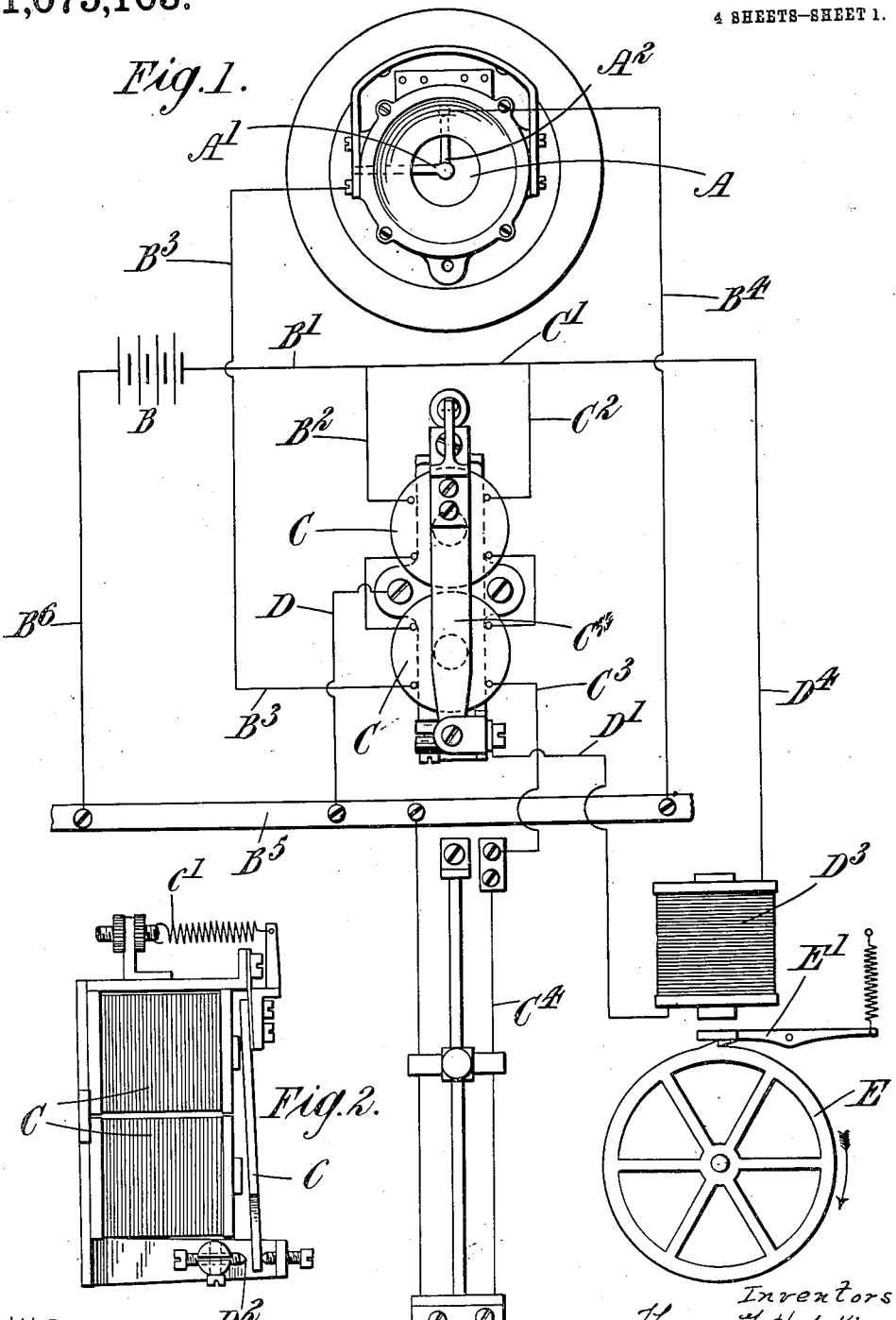

T. G. & W. HODGKINSON.
APPARATUS FOR INDICATING THE DIRECTION WHENCE SOUND TRAVELS.
APPLICATION FILED JULY 31, 1911.
1,075,103.
Patented Oct. 7, 1913.
4 SHEETS—SHEET 2.
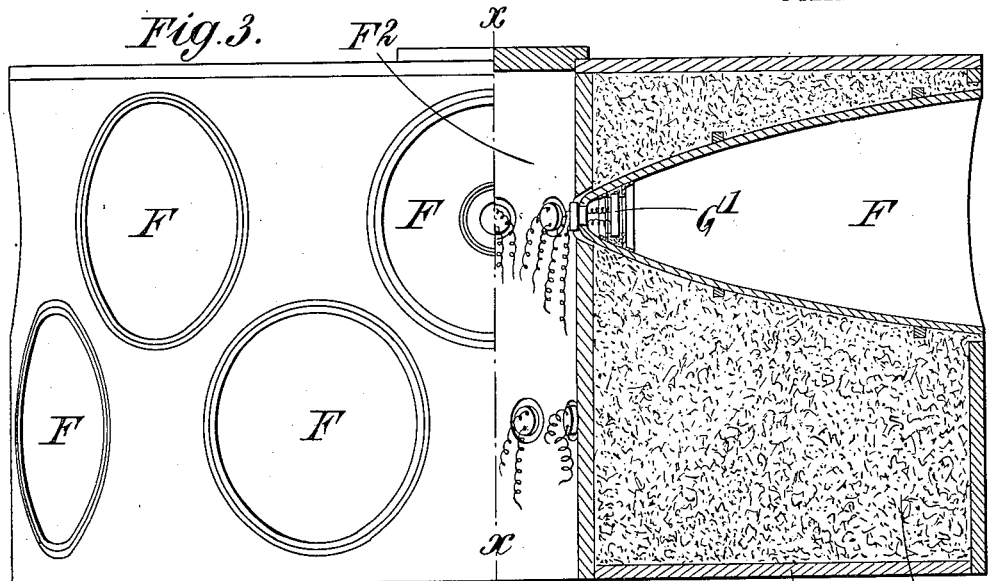
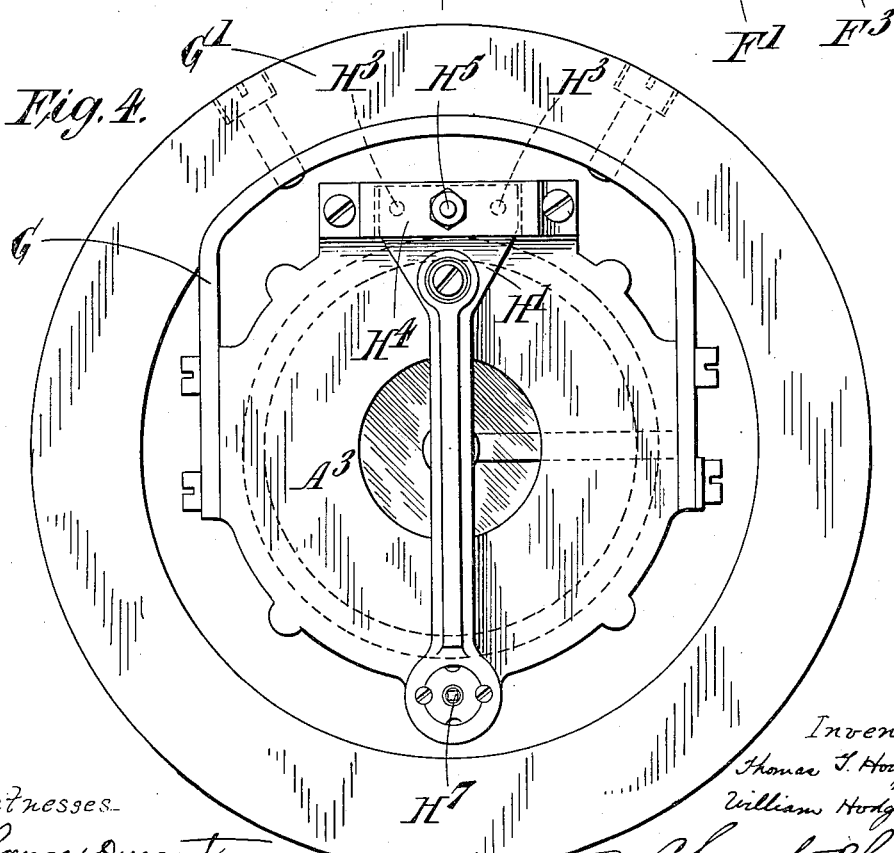

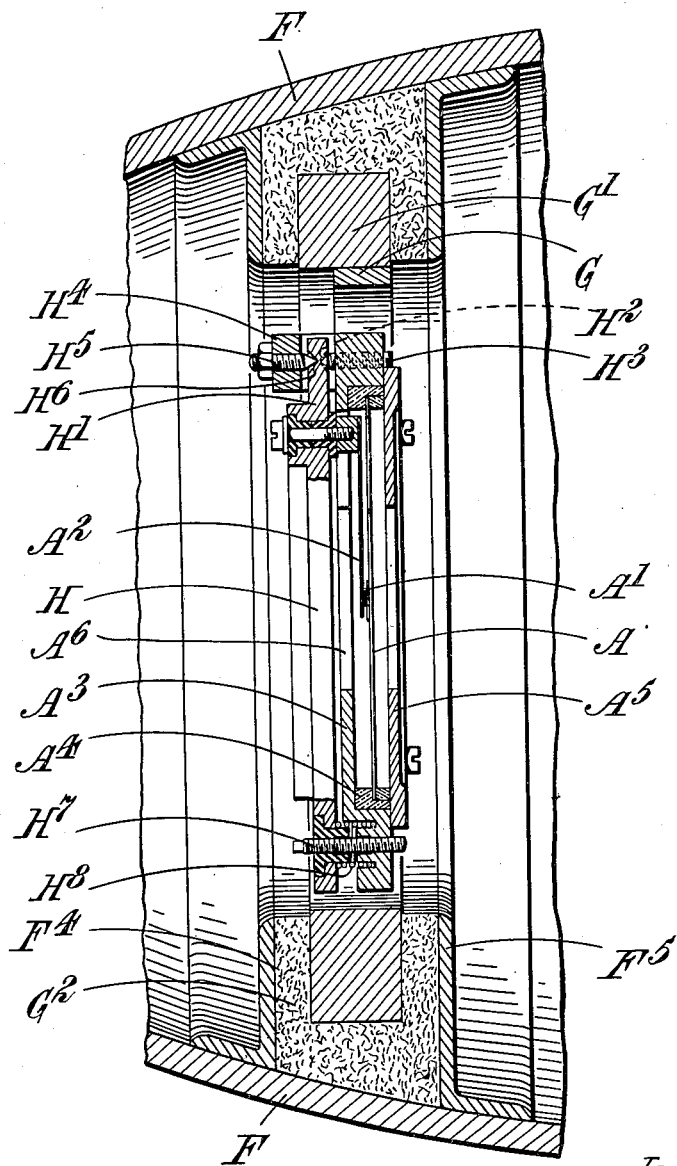

T. G. & W. HODGKINSON.
APPARATUS FOR INDICATING THE DIRECTION WHENCE SOUND TRAVELS.
APPLICATION FILED JULY 31, 1911.
1,075,103.
Patented Oct. 7, 1913.
4 SHEETS—SHEET 4.
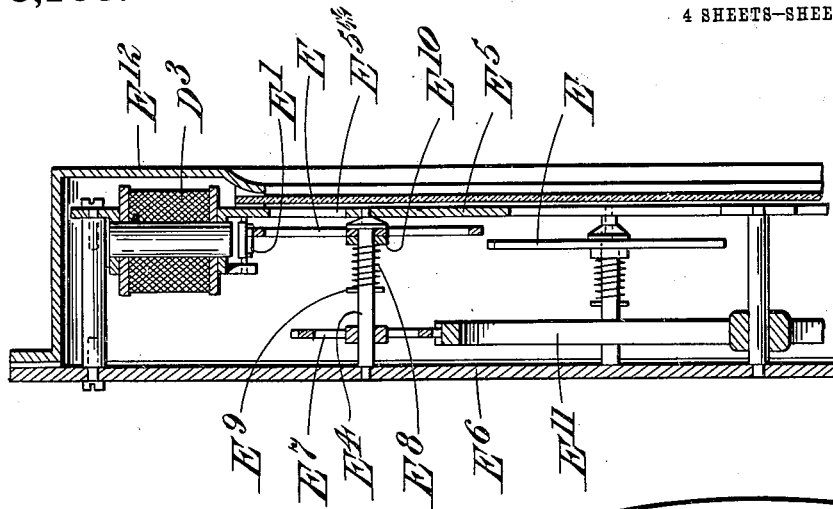
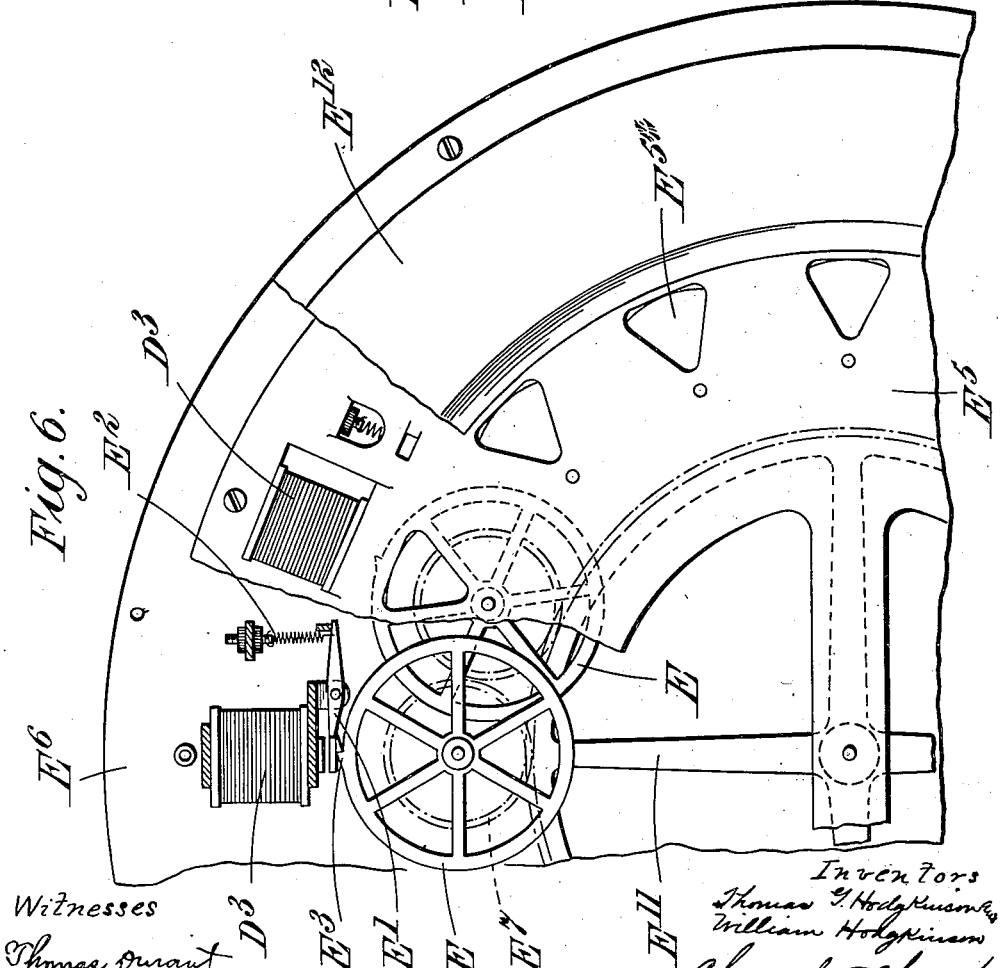

UNITED STATES PATENT OFFICE.

THOMAS GERALD HODGKINSON, OF COUNTY OF CHESTER, ENGLAND, AND WILLIAM HODGKINSON, OF CALCUTTA, INDIA.

APPARATUS FOR INDICATING THE DIRECTION WHENCE SOUND TRAVELS.

1,075,103. Specification of Letters Patent. Patented Oct. 7, 1913.

Application filed July 31, 1911. Serial No. 641,515.

*To all whom it may concern:*

Be it known that we, THOMAS GERALD HODGKINSON and WILLIAM HODGKINSON, subjects of the King of England, residing in Cheshire, England, and Calcutta, India, respectively, have invented certain new and useful Improvements in Apparatus for Indicating the Direction Whence Sound Travels, of which the following is a specification.

This invention is for improvements in or relating to apparatus for indicating the direction whence sound travels and is applicable to any purpose requiring such information but will be described more particularly in the form applied to ships for the purpose of one ship ascertaining the direction of another ship, which can be heard but not seen, or for detecting the direction of a fog-signal from a buoy or lighthouse.

According to this invention, for indicating the direction whence sound travels or has traveled, receiving apparatus is employed operated by sound waves transmitted through the air. Preferably one or more receiving devices arranged to pick up the sound waves from any direction are used in conjunction with indicator mechanism operating to show the direction whence the sound waves picked up by the receiving devices travel or have traveled. Each receiver is conveniently of the microphone type, that is to say, it comprises members that are in electrical contact with each other and can be vibrated by the sound waves so that the resistance between them is varied.

In a convenient form of apparatus a series of receivers are used whereof each is screened from sound waves in all directions but one and each is directed to a different point of the compass. With this form of apparatus indicator mechanism is employed whereby the particular receiver operated and hence the direction whence the sound travels can be ascertained. Thus the receivers may be set around a center common to them all and screened by providing each with a horn, the horns being radially disposed to the center about which the receivers are set. Each horn thus serves as a collector for sound traveling directly toward its mouth, but it operates as a screen against the reception of sound waves that are not directed to its mouth.

In the accompanying drawings:—Figure 1 is a diagrammatic view of one unit of the apparatus; Fig. 2 is an elevation of part of the apparatus indicated in Fig. 1; Fig. 3 is an elevation in part section of the horn and receiver apparatus; Fig. 4 is a rear view of one of the receivers; Fig. 5 is a section through the same; Fig. 6 shows diagrammatically part of the indicator apparatus; Fig. 7 is a section through part of the same.

Like letters indicate like parts throughout the drawings.

The apparatus indicated in Fig. 1 constitutes one complete unit, a series of which is employed in the form of apparatus described with reference to Figs. 1–6 but the single unit will first be briefly described to enable the general arrangement to be grasped. The receiver (which as stated above is of the microphone type) comprises a glass diaphragm A having secured to it a thin flexible metallic tongue $A^1$. A second thin flexible metallic tongue $A^2$ is carried at one end by a part that is adjustable relatively to the diaphragm and the other end is made to bear lightly upon the tongue $A^1$ at the center of the diaphragm. A battery B has one pole connected by wires $B^1$, $B^2$, to a differentially wound relay C. From the coils of the relay to which the wire $B^2$ is connected, a wire $B^3$ extends to the tongue $A^1$. The tongue $A^2$ is connected by a return wire $B^4$ connected by a bus-bar $B^5$ and wire $B^6$ to the opposite pole of the battery B. The battery B is further connected by wires $C^1$ $C^2$ that extend from the wire $B^1$ to the second winding of the differential relay C and from this second winding a wire $C^3$ is carried to an adjustable resistance $C^4$. The other end of the resistance is connected to the bus-bar $B^5$ and thus has electrical connection through the wire $B^6$ with the opposite pole of the battery. A wire D further connects the bus-bar $B^5$ and the frame of the relay, while a wire $D^1$ connects an insulated contact $D^2$ on the relay frame with one end of an electro-magnet coil $D^3$. The other end of the coil is connected by a wire $D^4$ to the wire $C^1$ and thence through the wire $B^1$ to the battery. The electro-magnet controls a catch or detent $E^1$ that controls an indicator plate E which always tends to rotate in the direction of the arrow.

In using this apparatus the resistance $C^4$ is adjusted to balance the resistance of the contact tongues $A^1$ $A^2$ of the receiver so that the armature $c$ of the relay, which is controlled by a spring $c^1$ normally remains in the position shown in Fig. 2. Directly the diaphragm A, however, is vibrated the resistance between the tongues $A^1$ $A^2$ is increased so that the balance of the currents passing through the coils of the relay is disturbed. The armature $c$ will therefore be drawn down by the action of the relay coils and brought against the contact piece $D^2$ thereby establishing a circuit between the battery and the electro-magnet $D^3$. This causes the magnet $D^3$ to lift the catch $E^1$ and permits the indicator disk E to turn around the movement of the indicator disk thus shows that the diaphragm has been made to vibrate and all that is necessary to adapt the apparatus for indicating the direction whence the sound travels whereby the diaphragm is vibrated, is to screen the diaphragm on all sides but one. It will then be known that the sound travels from a point opposite the open side. Such a unit could be used by itself the receiver being turned around until the indicator showed it was receiving the sound waves, when the direction whence they traveled would be known by the position of the receiver.

The screening is effected by mounting each diaphragm inside a horn F, Fig. 3. The horns of the various receivers are arranged radially around a vertical axis $x\,x$, the mouth of each horn being outward. They are carried in any conveneint form of frame $F^1$ and their inner ends are closed. Conveniently the central portion of the frame is hollow as at $F^2$ so that the wires connected to the various receivers can be carried down through the same through insulated plugs in the horns. The space $F^3$ between the horns is packed with any suitable material that is calculated to prevent vibration of the horns themselves.

The particular construction of the receivers is shown in Figs. 4 and 5. The glass diaphragm A is mounted in a recessed annular plate $A^3$ and held in place by packing $A^4$ that is gripped between the plate $A^3$ and open fronted cover plate $A^5$. The rear plate $A^3$ has a central orifice $A^6$ so that air is not confined between it and the diaphragm. The plate $A^3$ is rigidly secured to a yoke G which in turn is fastened to a heavy ring $G^1$. Within the horn and near its far end are two internal flanges $F^4$, $F^5$ and between these the ring $G^1$ is mounted, suitable packing $G^2$ being introduced to absorb vibration between the horn and receiver.

The tongue $A^1$ is shellacked or otherwise secured to the diaphragm A but the tongue $A^2$ is carried by an arm H that has an enlarged end $H^1$. This end is provided with two recesses $H^2$ entered by finely pointed set-screws $H^3$ carried by the annular plate $A^3$. A bridge piece $H^4$ carried by the plate $A^3$ extends over the enlarged end $H^1$ of the arm and at its center has a finely pointed set-screw $H^5$ which enters a recess $H^6$ in the end of the arm. The arm is thus carried between two set-screws on one side and a centrally situated screw on the other side whose points are all brought to a line about which the arm is free to swing. The opposite end of the arm is connected to the plate $A^3$ by a differential screw $H^7$, and a spring $H^8$ prevents any movement of the arm due to back lash. It will be seen that this device provides a fine adjustment for the tongue $A^2$ so that the latter can be made to bear exceedingly lightly against the operating tongue $A^1$ on the diaphragm. This insures delicacy of action and the adjustable resistances $C^4$ coöperate toward the same end as each resistance can be tuned up to its particular receiver until a proper balance of the currents through the respective circuits is obtained. It follows that the slightest disturbance of this resistance by the vibration of the diaphragm will cause the relay armature to be displaced thereby releasing the indicator alloted to that particular receiver.

The detailed construction of the indicator mechanism is shown in Figs. 6 and 7. As already stated, each comprises an electro-magnet $D^3$, and indicator wheel or disk E, and a locking pawl or catch $E^1$. The pawl $E^1$ is conveniently held down in such position as to lock the wheel E by a spring $E^2$. Each indicator wheel or disk has a single tooth $E^3$ that is engaged by the pawl $E^1$. The disk is mounted free on a spindle $E^4$ pivoted in plates $E^5$, $E^6$. Fast on the spindle is a wheel $E^7$ and surrounding the spindle is a spring $E^8$. One end of the spring bears against a pin $E^9$ in the spindle and the other bears against a collar $E^{10}$ which in turn has frictional engagement with the disk E. The wheel $E^7$ meshes with a wheel $E^{11}$ that is constantly rotated by any convenient mechanism.

The various electro-magnets with their wheels are arranged in a circle around the wheel $E^{11}$ so that the one wheel meshes with all the wheels $E^7$. The plates $E^5$ $E^6$ are circular, the magnets being mounted on the outer edge and covered in by an annular plate $E^{12}$ which overlaps the plate $E^5$. In the plate $E^5$ is a series of apertures $E^{5x}$ one opposite each indicator wheel E and these lie in a circle just around the inner edge of the plate $E^{12}$. One aperture is opposite each indicator wheel E and the tooth $E^3$ on each wheel is so arranged that when the wheel is in the position of rest the arms are not visible. but directly any one indicator is released, the arms, which may be colored red, will be seen rapidly passing the aperture showing that that particular indicator mechanism has been operated. It will be seen that so long as the wheels E are held stationary, the wheel E¹¹ and wheels E⁷ merely rotate the spindles E⁴ carrying with them the springs E⁸ and washers or collars E¹⁰ which latter rub against the stationary wheels E. As soon however as one catch E¹ is lifted the particular wheel E locked by that catch will begin to travel by the friction of the rotating collar E¹⁰ against it. All that now is necessary to locate the direction whence the sound operating the mechanism proceeds, is to establish the direction in which the receiver connected with each indicator faces. Thus if the apparatus is used on board ship the top indicator may be connected to the receiver that faces "Straight ahead" and the bottom one to that which faces direct "Astern", the others being allotted to the receivers allotted to the various points on the port and starboard sides.

It will be noted that this indicator mechanism is simple in construction and requires no setting as directly any particular receiver ceases to operate, the locking pawl E¹ is brought back by its spring E² to the locking position and the indicating member will thus be automatically brought to rest in the non-indicating position.

Obviously the indicating members shown as wheels or perforated disks whose arms are colored may take the form of solid disks if desired or may have any other suitable shape.

The constructions of apparatus given above are only by way of example, as obviously many modifications may be made in the method of carrying out this invention without departing from the spirit of the invention, for example, it might be possible in some instances to use a single receiver with its diaphragm set in a horizontal plane and having above it a rotatable horn bent at a right angle so that the horn could be turned to receive the sound waves traveling in a horizontal plane from any direction. The horn could be connected to a simple form of indicator or it could be used itself to indicate the direction whence the sound was traveling, and a galvanometer or other device employed to indicate when the diaphragm was vibrating under the action of sound waves collected by the horn.

What we claim as our invention and desire to secure by Letters Patent is:—

1. In apparatus for determining the direction whence sound comes, the combination with a vibratory diaphragm of two vibratory electrical contact members normally in contact whereof one vibrates with the diaphragm and the other is resiliently supported in relation thereto so as to be set in vibration thereby, two electrical circuits adapted to produce opposed but normally balanced effects upon a part exposed to the action of both and whereof one circuit includes the contact between the said two vibratory contact members, and means controlled by the apparatus for ascertaining the point toward which the apparatus is directed when the diaphragm is vibrated, substantially as set forth.

2. In apparatus for determining the direction whence sound comes, the combination with a plurality of vibratory diaphragms each provided with two vibratory electrical contact members normally in contact whereof one vibrates with the diaphragm and the other is resiliently supported in relation thereto so as to be set in vibration thereby and means whereby each diaphragm is arranged to be excited by sound waves coming from one direction only, of a plurality of movable indicator members, a driving member operatively connected with all the indicator members and that is constantly moved when the apparatus is in use, means for holding each indicator member normally stationary such means being operatively connected with a part exposed to the action of both of two electrical circuits adapted to exert thereon opposed but normally balanced effects and of which one circuit includes the contact between the said two vibratory contact members in such a manner that when the contact is vibrated the indicator member is released and permitted to move under the action of the single driving member, substantially as set forth.

3. In apparatus for determining the direction whence sound comes, the combination with a plurality of vibratory diaphragms each provided with a pair of vibratory electrical contact members normally in contact whereof one vibrates with the diaphragm and the other is resiliently supported in relation thereto so as to be set in vibration thereby and means whereby each diaphragm is arranged to be excited by sound waves coming from one direction only, of a plurality of movable indicator members, a driving member that has frictional engagement with all the indicator members and is constantly moving when the apparatus is in use, a plurality of detents one for each indicator member that normally hold the indicator members stationary, and operative connection between each detent and a part exposed to the action of both of two electrical circuits adapted to exert thereon opposed but normally balanced effects and of which one circuit includes the contact between one of the said pairs of vibratory contact members one detent being allotted to each diaphragm whereby any one diaphragm when vibrated withdraws the corresponding detent from its indicator member and permits the latter to be moved by the driving member, substantially as set forth.

4. In apparatus for determining the direction whence sound comes, the combination of, a vibratory glass diaphragm, an electrical contact whereof one element is carried by the glass diaphragm and vibrates therewith and the other takes the form of a resilient tongue whose end is opposed to the first element, a part exposed to the action of both of two electrical circuits adapted to exert thereon opposed but normally balanced effects and of which one circuit includes the contact between the said two vibratory contact members and means controlled by the apparatus for ascertaining the point toward which the apparatus is directed when the diaphragm is vibrated substantially as set forth.

5. In apparatus for determining the direction whence sound comes, the combination of, a vibratory glass diaphragm, an electrical contact whereof one element is carried by the glass diaphragm and vibrates therewith and the other takes the form of a resilient tongue whose end is opposed to the first element, an arm to carry the resilient tongue that is pivoted about an axis parallel to the plane wherein the diaphragm lies, a differential screw operative between the arm and its support, a part exposed to the action of both of two electrical circuits adapted to exert thereon opposed but normally balanced effects and of which one circuit includes the contact between the said two vibratory contact members and means controlled by the apparatus for ascertaining the point toward which the apparatus is directed when the diaphragm is vibrated substantially as set forth.

6. In apparatus for determining the direction whence sound comes, the combination of, a vibratory glass diaphragm, an electrical contact whereof one element is carried by the glass diaphragm and vibrates therewith and the other takes the form of a resilient tongue whose end is opposed to the first element, an arm carrying the resilient tongue that is hinged between three points disposed in line with each other which line is parallel with the plane wherein the diaphragm lies, two of the points being on one side of the arm and one on the other side in a position intermediate of the other two points, a differential screw operative between the arm and its support, a part exposed to the action of both of two electrical circuits adapted to exert thereon opposed but normally balanced effects and of which one circuit includes the contact between the said two vibratory contact members, and means controlled by the apparatus for ascertaining the point toward which the apparatus is directed when the diaphragm is vibrated substantially as set forth.

In testimony whereof we have signed our names to this specification in the presence of two subscribing witnesses.

THOMAS GERALD HODGKINSON.
WILLIAM HODGKINSON.

Witnesses to T. G. Hodgkinson:
  A. M. HAYWARD,
  HARRY B. BRIDGE.

Witnesses to W. Hodgkinson:
  CHARLES B. PERRY,
  K. M. KIRKPATRICK.